(12) United States Patent
Masel et al.

(10) Patent No.: US 7,785,728 B2
(45) Date of Patent: Aug. 31, 2010

(54) PALLADIUM-BASED ELECTROCATALYSTS AND FUEL CELLS EMPLOYING SUCH ELECTROCATALYSTS

(75) Inventors: Richard I. Masel, Champaign, IL (US); Yimin Zhu, Urbana, IL (US); Robert T. Larsen, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1774 days.

(21) Appl. No.: 10/817,361

(22) Filed: Apr. 2, 2004

(65) Prior Publication Data

US 2005/0136309 A1 Jun. 23, 2005

Related U.S. Application Data

(63) Continuation-in-part of application No. 10/407,385, filed on Apr. 4, 2003, now Pat. No. 7,132,188.

(60) Provisional application No. 60/369,992, filed on Apr. 4, 2002, provisional application No. 60/519,095, filed on Nov. 12, 2003.

(51) Int. Cl.
*H01M 8/10* (2006.01)

(52) U.S. Cl. ........................................... 429/40

(58) Field of Classification Search ................ 429/12, 429/13, 30, 34, 36, 38, 33, 40
See application file for complete search history.

(56) References Cited

U.S. PATENT DOCUMENTS

| | | | |
|---|---|---|---|
| 3,198,666 A | 8/1965 | Bruneberg et al. |
| 3,297,487 A | 1/1967 | Pomeroy et al. |
| 3,467,554 A | 9/1969 | Forten et al. |
| 3,506,494 A | 4/1970 | Adlhart |
| 3,711,385 A | 1/1973 | Beer |
| 4,039,409 A | 8/1977 | LaConti et al. |
| 4,081,409 A | 3/1978 | McNicol et al. |
| 4,127,468 A | 11/1978 | Alfenaar et al. |
| 4,431,750 A | 2/1984 | McGinnis et al. |
| 4,447,506 A | 5/1984 | Luczak et al. |
| 4,457,823 A | 7/1984 | LaConti et al. |

(Continued)

FOREIGN PATENT DOCUMENTS

CN 1425499 A 6/2003

(Continued)

OTHER PUBLICATIONS

Ha et al. "Methanol Conditioning for Improved performance of Formic Acid Fuel Cells," J Power Source 112 655-59 (2002).*

(Continued)

*Primary Examiner*—Patrick Ryan
*Assistant Examiner*—Monique Wills
(74) *Attorney, Agent, or Firm*—Greer, Burns & Crain Ltd.

(57) ABSTRACT

A direct organic fuel cell includes a fluid fuel comprising formic acid, an anode having an electrocatalyst comprising palladium nanoparticles, a fluid oxidant, a cathode electrically connected to the anode, and an electrolyte interposed between the anode and the cathode.

28 Claims, 4 Drawing Sheets

U.S. PATENT DOCUMENTS

Figure 1:
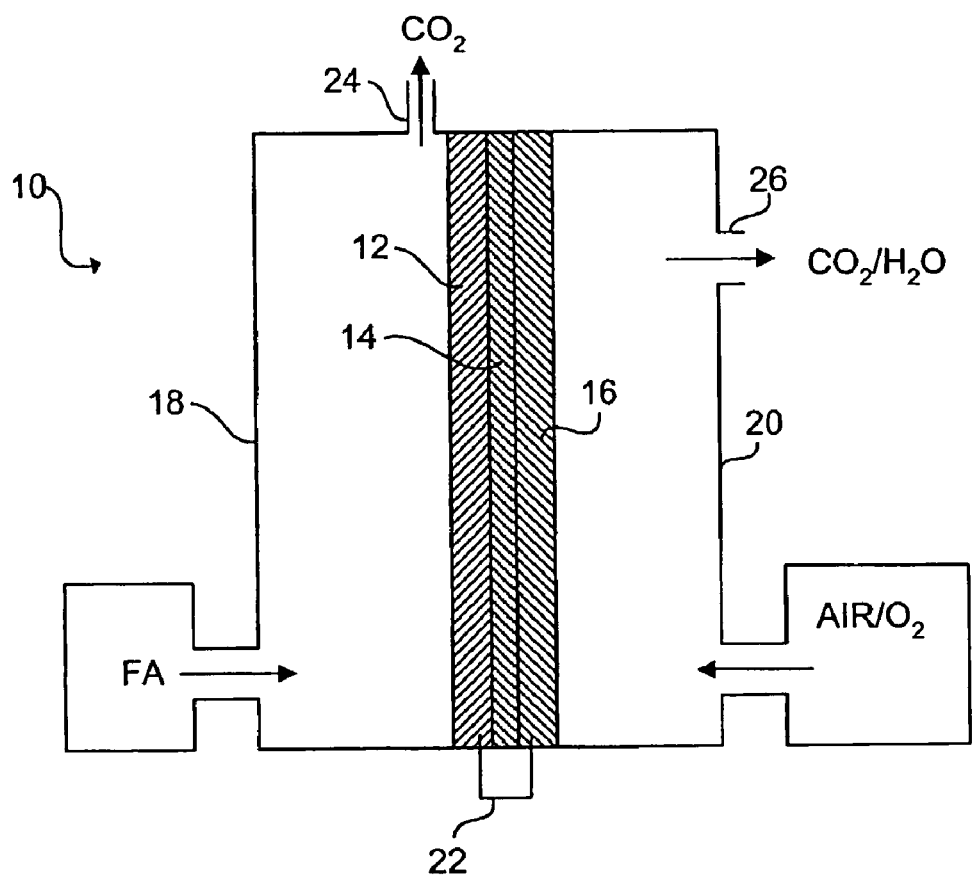

| | | | |
|---|---|---|---|
| 4,457,986 | A | 7/1984 | Bindra et al. |
| 4,478,917 | A | 10/1984 | Jujita et al. |
| 4,493,878 | A | 1/1985 | Horiba et al. |
| 4,797,380 | A | 1/1989 | Motoo et al. |
| 4,806,515 | A | 2/1989 | Luczak et al. |
| 4,822,699 | A | 4/1989 | Wan |
| 5,004,424 | A | 4/1991 | Larminie |
| 5,024,905 | A | 6/1991 | Itoh et al. |
| 5,041,195 | A | 8/1991 | Taylor et al. |
| 5,096,866 | A | 3/1992 | Itoh et al. |
| 5,133,842 | A | 7/1992 | Taylor et al. |
| 5,183,713 | A | 2/1993 | Kunz |
| 5,208,207 | A | 5/1993 | Stonehart et al. |
| 5,225,391 | A | 7/1993 | Stonehart et al. |
| 5,246,791 | A | 9/1993 | Fisher et al. |
| 5,364,711 | A | 11/1994 | Yamada et al. |
| 5,393,619 | A | 2/1995 | Mayer et al. |
| 5,599,638 | A | 2/1997 | Surampudi et al. |
| 5,773,162 | A | 6/1998 | Surampudi et al. |
| 5,856,036 | A | 1/1999 | Smotkin et al. |
| 5,904,740 | A | 5/1999 | Davis et al. |
| 6,007,934 | A | 12/1999 | Auer et al. |
| 6,020,083 | A | 2/2000 | Breault et al. |
| 6,146,782 | A | 11/2000 | Wendt et al. |
| 6,165,635 | A | 12/2000 | Auer et al. |
| 6,248,460 | B1 | 6/2001 | Surampudi et al. |
| 6,284,402 | B1 | 9/2001 | Mallouk et al. |
| 6,326,098 | B1 | 12/2001 | Itoh et al. |
| 6,387,557 | B1 | 5/2002 | Krasij et al. |
| 6,432,284 | B1 | 8/2002 | Narayanan et al. |
| 6,447,941 | B1 | 9/2002 | Tomimatsu et al. |
| 6,458,479 | B1 | 10/2002 | Ren et al. |
| 6,485,851 | B1 | 11/2002 | Narayanan |
| 6,492,052 | B2 | 12/2002 | Ren |
| 6,492,147 | B2 | 12/2002 | Imamura et al. |
| 6,495,278 | B1 | 12/2002 | Schmid et al. |
| 6,498,121 | B1 | 12/2002 | Gorer |
| 6,517,965 | B1 | 2/2003 | Gorer |
| 6,649,300 | B2 | 11/2003 | Ito et al. |
| 6,660,680 | B1 | 12/2003 | Hampden-Smith et al. |
| 6,670,301 | B2 | 12/2003 | Adzic et al. |
| 6,686,308 | B2 | 2/2004 | Mao et al. |
| 6,723,678 | B2 | 4/2004 | Gorer |
| 6,770,394 | B2 | 8/2004 | Appleby et al. |
| 2002/0107140 | A1 | 8/2002 | Hampden-Smith et al. |
| 2003/0198852 | A1 | 10/2003 | Masel et al. |
| 2004/0045816 | A1* | 3/2004 | Masel et al. ........... 204/290.14 |
| 2004/0115518 | A1 | 6/2004 | Masel et al. |

FOREIGN PATENT DOCUMENTS

| | | |
|---|---|---|
| GB | 1273045 | 5/1972 |
| GB | 1292791 | 10/1972 |
| JP | 01227361 A | 3/1988 |

OTHER PUBLICATIONS

A. Wieckowski and R. I. Masel, , "UHV and electrochemical studies of CO and methanol adsorbed at platinum/ruthenium surfaces, and reference to fuel cell catalysis," Electrochimica Acta 47, 22-23, 3637-3652 (2002).

N. Markovic, H. Gasteiger, P. Ross, X. Jiang, I. Villegas and M. Weaver, "Electro-oxidation mechanisms of methanol and formic acid on Pt-Ru alloy surfaces," Electrochimica Acta, 40, 91-98, (1995).

Arenz, V. Stamenkovic, T. J. Schmidt, K. Wandelt, P. N. Ross and N. M. Markovic, "The electro-oxidation of formic acid on Pt Pd single crystal bimetallic surfaces," Physical Chemistry Chemical Physics, 5, 4242, (2003).

N. Watanabe, K. Iwatsu, A. Yamakata, T. Ohtani, J. Kubota, J. N. Kondo, A. Wada, K. Domen and C. Hirose, "SFG study of formic acid on a Pt(110)-(1x2) surface," Surf. Sci., 651, 357-358, (1996).

M. Watanabe, "Electrocatalysis By Ad-Atoms, Part XXIII. Design of Platinum Ad-Electrodes for Formic Acid Fuel Cells with Ad-Atoms of the IVth and the Vth Groups," J. Electroanal. Chem. 250 , Feb. 1988, p. 117-125.

S. W. Jorgensen and R. J. Madix,, "Active oxygen on Group VIII metals: activation of formic acid and formaldehyde on Pd(100)," J. Am. Chem. Soc., 110, 397, (1988).

F. Solymosi and I. Kovacs, "Adsorption and reaction of HCOOH on K-promoted Pd(100) surfaces," Surf. Sci., 259, 95, (1991).

C. Xu and D. W. Goodman, "Adsorption and Reaction of Formic Acid on a Pseudomorphic Palladium Monolayer on Mo(110)," J. Phys. Chem., 100, 245, (1996).

Weber, M.; Wang, J.T.; Wasmus, S; Savinell, R.F.; "Formic Acid Oxidation in a Polymer Electrolyte Fuel Cell: A Real-Time Mass-Spectrometry Study," J. Electochem. Soc., 1996, 143(7), L158-l160.

P. Waszczuk, J. Solla-Gullón, H.S. Kim, Y.Y. Tong, V. Montiel, A. Aldaz, and A. Wieckowski, "Methanol Electrooxidation on Platinum/Ruthenium Nanoparticle Catalysts," Journal of Catalysis 203, pp. 1-6 (2001).

Gdowski, G.E.; Fai, J.A.; Maxid, R.J.; Reactive Scattering of Small Molecules from Platinum Crystal Surfaces: $D_2CO$, $CH_3$, $CH_3OH$, HCOOH and the Nonanomalous Kinetics of Hydrogen Atom Recombination, Surf. Sci., 1983, 127(3) 541-54.

Papageorgopoulos, D. et al.; "CO Tolerance of Pd Rich Platinum Palladium Carbon Supported Electrocatalysts for PEMFC Applications", *Journal of the Electrochemical Society, in press*, Aug. 2002, pp. 1-22.

Adzic, R. et al.: "Structural Effects in Electrocatalysis", *J. Electroanal. Chem.*, 1983, pp. 79-88.

Avramov-Ivic, M. et al. ; "The electrocatalytic properties of the oxides of noble metals in the electrooxidation of methanol and formic acid", *Electrochimica Acta*, 2001, pp. 3175-3180.

Baldauf, M. et al.; "Formic Acid Oxidation on Ultrathin Pd Films on Au(*hkl*) and Pt(*hkl*) Electrodes", *J. Phys.Chem.*, 1996, pp. 11375-11381.

Becerik, I. et al.; "Electro-oxidation of Formic Acid on Highly Dispersed Platinum and Perchlorate Doped Polypyrrole Electrodes", *Journal of The Electrochemical Society*, 2001, pp. D49-D54.

Capon, A. et al.; "The Effect of Strong Acid on the Reactions of Hydrogen and Oxygen on the Noble Metals a Study Using Cyclic Voltammetry and a New Teflon Electrode Holder", *Electroanalytical Chemistry and Interfacial Electrochemistry*, 1972, pp. 275-286.

Capon, A. et al.; "The Oxidation of Formic Acid on Noble Metal Electrodes II. A Comparison Of the Behaviour of Pure Electrodes", *Electroanalytical Chemistry and Interfacial Electrochemistry*, 1973, pp. 239-254.

Capon, A. et al.; "The Oxidation of Formic Acid on Noble Metal Electrodes III. Intermediates and Mechanism on Platinum Electrodes", *Electroanalytical Chemistry and Interfacial Electrochemistry*, 1973, pp. 205-231.

Capon, A. et al.; "The Oxidation of Formic Acid on Noble Metal Electrodes IV. Platinum and Palladium Electrodes", *Electroanalytical Chemistry and Interfacial Electrochemistry*, 1975, pp. 285-305.

Chi, N. et al.; "Electrocatalytic oxidation of formic acid by Pt/Co nanoparticles", *Catalysis Letters* vol. 71, No. 1-2, 2001, pp. 21-26.

Clavilier, J. et al. ; "Heterogeneous electrocatalysis on well defined platinum surfaces modified by controlled amounts of irreversibly adsorbed adatoms", *J. Electroanal. Chem.*, 1989, pp. 89-100.

Climent, V. et al.; "Electrocatalysis of formic acid and CO oxidation on antimony-modified Pt(111) electrodes", *Electrochimica Acta*, 1998, pp. 1403-1414.

El-Shafei, A. et al.; "Electrocatalytic oxidation of formic acid on Pt binary and ternary electrodes in $H_3PO_4$", *Journal of Electroanalytical Chemistry*, 1993, pp. 159-165.

El-Shafei, A.; "Study of nickel upd at a polycrystalline Pt electrode and its influence on HCOOH oxidation in acidic and nearly neutral media", *Journal of electroanalytical Chemistry*, 1998, pp. 81-89.

Fernandez-Vega, A. et al. ; "Heterogeneous electrocatalysis on well defined platinum surfaces modified by controlled amounts of irreversibly adsorbed adatoms", *J. Electroanal. Chem.*, 1989, pp. 101-113.

Gonzalez, M.J. et al. ; "Electrocatalytic Oxidation of Small Carbohydrate Fuels at Pt-Sn Modified Electrodes", *J. Phys. Chem.* 1998, pp. 9881-9890.

Ha, S. et al.; "A miniature air breathing direct formic acid fuel cell", *Journal of Power Sources*, 2004, pp. 119-124.

Ha, S. et al.; "Methanol conditioning for improved performance of formic acid fuel cells", *Journal of Power Sources*, 2002, pp. 655-659.

Harmsen, J. et al.; "Kinetic modeling for wet air oxidation of formic acid on a carbon supported platinum catalyst", *Applied Catalysis*, 1997, pp. 499-509.

Hartung, T. et al.; "Catalytic Effects of Hg and Ti Submonolayers on the Electrooxidation of Formic Acid on Pt", *J. Electroanal. Chem.*, 1986, pp. 135-149.

Herrero, E. et al.; "Oxidation of formic acid on Pt(111) electrodes modified by irreversibly absorbed tellurium", *Journal of Electroanalytical Chemistry*, 1995, pp. 161-167.

Herrero, E. et al.; "Oxidation of formic acid on Pt(100) electrodes modified by irreversibly absorbed tellurium", *Journal of Electroanalytical Chemistry*, 1995, pp. 145-154.

Jiang, J. et al.; "Nanostructured platinum as an electrocatalyst for the electrooxidation of formic acid", *Journal of Electroanalytical Chemistry*, 2002, pp. 64-70.

Beden, B. et al. ; "Electrocatalytic Activity of Noble Metals for the Oxidation of Formate in Neutral Medium", *J. Electroanal. Chem.*, 1979, pp. 127-131.

Llorca, M. et al.; "Formic acid oxidation on $Pd_{ad}$ + Pt(100) and $Pd_{ad}$ + Pt(111) electrodes", *Journal of Electroanalytical Chemistry*, 1994, pp. 151-160.

Llorca, M. et al.; "Formic acid oxidation on Pt(111) electrodes modified by irreversibly adsorbed selenium", *Journal of Electroanalytical Chemistry*, 1994, pp. 217-225.

Lu, G. et al.; "Formic Acid Decomposition on Polycrystalline Platinum and Palladized Platinum Electrodes", *J. Phys. Chem.*, 1999, pp. 9700-9711.

McGovern, M. et al. ; "Effects of Nafion as a binding agent for unsupported nanoparticle catalysts", *Journal of Power Sources*, 2003, pp. 35-39.

Ha, S. et al.; "Methanol conditioning for improved performance of formic acid fuel cells", *Journal of Power Sources*, 2002, pp. 1-5.

Shen, P. et al.; "Performance of CO-electrodeposited $Pt-Ru/WO_3$ electrodes for the electrooxidation of formic acid at room temperature", *Journal of Electroanalytical Chemistry*, 1995, pp. 223-225.

Waszczuk, P. et al.; "A nanoparticle catalyst with superior activity for electrooxidation of formic acid", *Electrochemistry Communications*, 2002, pp. 599-603.

Waszczuk, P. et al.; "A nanoparticle catalyst with superior activity for electrooxidation of formic acid [Electrochem. Commun. 4(2002) 599-603]", *Electrochemistry Communications*, 2002, p. 732.

Rhee, Y. et al.; "Crossover of formic acid through Nafion® membranes", *Journal of Power Sources*, 2003, pp. 35-38.

Pron'kin, S. et al.; "Nanoparticles of Pt hydrosol immobilised on Au support : an approach to the study of structural effects in electrocatalysis", *Electrochimica Acta*, 2001, pp. 2343-2351.

Rice, C. et al.; "Catalysts for direct formic acid fuel cells", *Journal of Power Sources*, 2003, pp. 229-235.

Rice, C. et al.; "Direct formic acid fuel cells", *Journal of Power Sources*, 2002, pp. 83-89.

Gasteiger, H. et al.; "Electro-Oxidation of Small Organic Molecules on Well-Characterized Pt-Ru Alloys", *Electrochimica Acta*, vol. 39, No. 11/12, 1994, pp. 1825-1832.

Smith, S. et al.; "Structural effects on the oxidation of HCOOH by bismuth modified Pt(111) electrodes with (110) monatomic steps", *Journal of Electroanalytical Chemistry*, 1999, pp. 43-49.

Shibata, M. et al.; "Electrocatalysis by Ad-Atoms", *J. Electroanal Chem.*, 1988, pp. 253-264.

Chen, S. et al.; "Enhancement of the electrochemical oxidation of formic acid. Effects of anion absorption and variation of rotation rate", *Electrochimica Acta*, 2001, pp. 3481-3492.

Beltowska-Brzezinska, M. et al.; "The Influence of Upd-Lead on the Adsorption of Formaldehyde, Formic Acid and Methanol on Pt In Acid Solution", *Electrochimica Acta*, vol. 30, No. 11, 1985, pp. 1465-1471.

Watanabe, M. et al.; "Electrocatalysis by Ad-Atoms", *J. Electroanal. Chem.*, 1985, pp. 367-375.

Xia, X.; "New insights into the influence of upd Sn on the oxidation of formic acid on platinum in acidic solution", *Electrochimica Acta*, 1999, pp. 1057-1066.

Xiang, J. et al.; "Investigation of the mechanism of the electrochemical oxidation of formic acid at a gold electrode in sulfuric acid solution", *Journal of Electroanalytical Chemistry*, 2001, pp. 95-100.

Yang, Y. et al.; "Surface modification and electrocatalytic properties of Pt(100), Pt(110), Pt(320) and Pt(331) electrodes with Sb towards HCOOH oxidation", *Electrochimica Acta*, 2001, pp. 4339-4348.

Sobkowski, J. et al.; "The Behaviour of Formic Acid on a Rhodium Electrode", *J. Electroanal. Chem.*, 1978, pp. 309-320.

Zhang, X. et al.; "Electrocatalytic Oxidation of Formic Acid on Ultrafine Palladium Particles Supported on a Glassy Carbon", *Electrochimica Acta*, vol. 40, No. 12, 1995, pp. 1889-1897.

Zhu, Y. et al.; "High power density direct formic acid fuel cells", *Journal of Power Sources*, 2004, pp. 8-14.

* cited by examiner

1

PALLADIUM-BASED ELECTROCATALYSTS AND FUEL CELLS EMPLOYING SUCH ELECTROCATALYSTS

CROSS-REFERENCE TO RELATED APPLICATIONS(S)

This application is a continuation-in part of, and claims priority benefits from, U.S. patent application Ser. No. 10/407,385, now U.S. Pat. No. 7,132,188, filed on Apr. 4, 2003, entitled "Fuel Cells and Fuel Cell Catalysts", which in turn claims priority benefits from U.S. Provisional Patent Application Ser. No. 60/369,992, filed Apr. 4, 2002. This application also claims priority from U.S. Provisional Patent Application Ser. No. 60/519,095, filed on Nov. 12, 2003. The '385, '992 and '095 applications are incorporated herein by reference in their entireties.

STATEMENT OF GOVERNMENT INTEREST

This invention was made with Government assistance under Department of Energy Grant No. DEGF-02-99ER14993. The Government has certain rights in the invention.

FIELD OF THE INVENTION

The present invention relates generally to fuel cells and catalysts for fuel cells. In particular, the present invention relates to electrocatalysts for direct fluid feed fuel cells, and especially direct formic acid feed fuel cells.

BACKGROUND OF THE INVENTION

Fuel cells are electrochemical cells in which a free energy change resulting from a fuel oxidation reaction is converted into electrical energy. Applications for fuel cells include battery replacement, mini- and microelectronics, automotive engines and other transportation power generators, power plants, and many others. One advantage of fuel cells is that they are substantially pollution-free.

In hydrogen fuel cells, hydrogen gas is oxidized to form water, with a useful electrical current produced as a byproduct of the oxidation reaction. A solid polymer membrane electrolyte layer can be employed to separate the hydrogen fuel from the oxygen. The anode and cathode are arranged on opposite faces of the membrane. Electron flow along the electrical connection between the anode and the cathode provides electrical power to load(s) interposed in circuit with the electrical connection between the anode and the cathode. Hydrogen fuel cells are impractical for many applications, however, because of difficulties related to storing and handling hydrogen gas.

Organic fuel cells may prove useful in many applications as an alternative to hydrogen fuel cells. In an organic fuel cell, an organic fuel such as methanol is oxidized to carbon dioxide at an anode, while air or oxygen is simultaneously reduced to water at a cathode. One advantage over hydrogen fuel cells is that organic/air fuel cells can be operated with a liquid organic fuel. This diminishes or eliminates problems associated with hydrogen gas handling and storage. Some organic fuel cells require initial conversion of the organic fuel to hydrogen gas by a reformer. These are referred to as "indirect" fuel cells. The need for a reformer increases cell size, cost, complexity, and start up time. Other types of organic fuel cells, called "direct," eliminate these disadvantages by directly oxidizing the organic fuel without conversion to hydrogen gas. To date, fuels employed in direct organic fuel cell development methanol and other alcohols, as well as formic acid and other simple acids.

Conventional direct fuel cells have unresolved problems related to the electro-oxidation reaction promoted by the anode. For example, an intermediate produced during the oxidation/reduction reaction in the existing fuel cells is poisonous carbon monoxide gas. Hazards are thus presented. Also, CO is known to poison catalysts. especially platinum (Pt) based catalysts and to thereby decrease cell efficiency.

Other metals or metal combinations have been employed as anode catalysts, such as platinum-palladium (PtPd) and platinum-ruthenium (PtRu). These combinations, however, have not solved the problem of CO poisoning the catalysts.

A further problem is that power levels in direct organic fuel cells have not previously been sufficient to run many commonly-used devices.

The present fuel cells, which employ palladium-based electrocatalysts, overcome one or more of these and other problems unresolved in the field.

SUMMARY OF THE INVENTION

In one embodiment, a direct organic fuel cell comprises:
(a) a fluid fuel comprising formic acid;
(b) an anode to which the fluid fuel is directed, the anode having an electrocatalyst associated therewith, the electrocatalyst comprising palladium nanoparticles;
(c) a fluid oxidant;
(d) a cathode to which the fluid oxidant is directed, the cathode electrically connected to the anode; and
(e) an electrolyte interposed between the anode and the cathode.

In a preferred embodiment, the fluid fuel comprises at least 3 M formic acid, the electrolyte is an ion exchange membrane, preferably a proton exchange membrane, most preferably a perfluorosulfonic acid ionomer. The electrolyte is preferably selected from the group comprising porous silicon, ruthenium oxide, and acid electrolytes.

In a preferred embodiment, the anode catalyst comprises palladium nanoparticles having at least one of: (a) a diameter of less than about 15 nm, and (b) a radius of curvature less than about 7.5 nm. More preferably, the anode catalyst comprises palladium nanoparticles having at least one of: (a) a diameter of less than about 10 nm, and (b) a radius of curvature less than about 5 nm. Most preferably, the anode catalyst comprises palladium nanoparticles, the nanoparticles having at least one of: (a) a diameter of less than about 6 nm, and (b) a radius of curvature less than about 3 nm.

In a preferred embodiment, the anode catalyst comprises palladium nanoparticles with a surface area of at least about 5 $m^2/g$, more preferably at least about 23 $m^2/g$, and most preferably at least about 40 $m^2/g$.

In a preferred embodiment, the present direct organic fuel cell is capable of generating a power density of at least about 150 $mW/cm^2$ when operating at about 21° C., more preferably, at least about 270 $mW/cm^2$. The present direct organic fuel cell is capable of generating an open circuit voltage of at least about 0.8 V. The present anode catalyst is configured to promote reaction of the formic acid via a direct path that diminishes formation of a CO intermediate.

In another embodiment, an electro-oxidation catalyst for a direct organic acid fuel cell comprises palladium nanoparticles. The catalyst is preferably associated with an anode, and is preferably deposited on the surface of an anode.

The electrocatalyst in a further embodiment of the present direct organic fuel cell consists essentially of palladium nanoparticles.

BRIEF DESCRIPTION OF THE DRAWING(S)

FIG. 1 is a schematic diagram of an exemplary direct organic fuel cell that employs the present palladium-based electrocatalyst.

Figure 2:
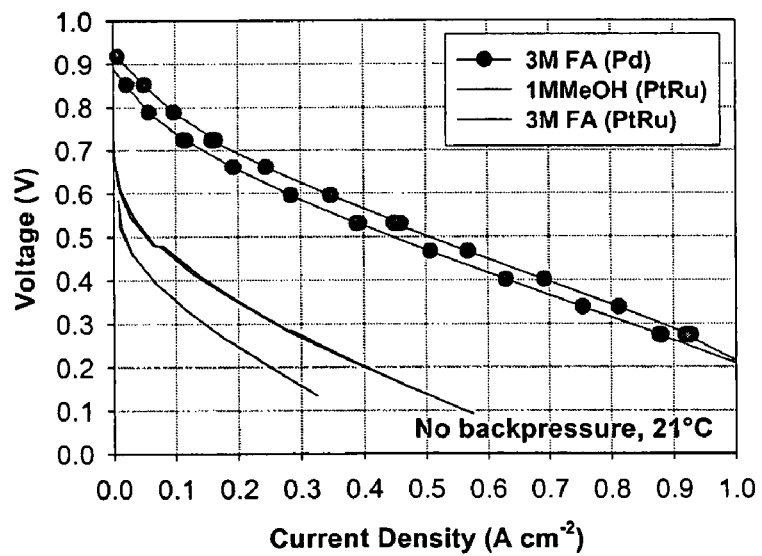

FIG. 2 is a polarization plot of formic acid/air or methanol/ air fuel cell voltage as a function of current density at 21° C. The flow rate of liquid fuel to the anode was 1 mL/min. Air was supplied to the cathode at a flow rate of 350 mL/min without back-pressure and/or humidification.

Figure 3:
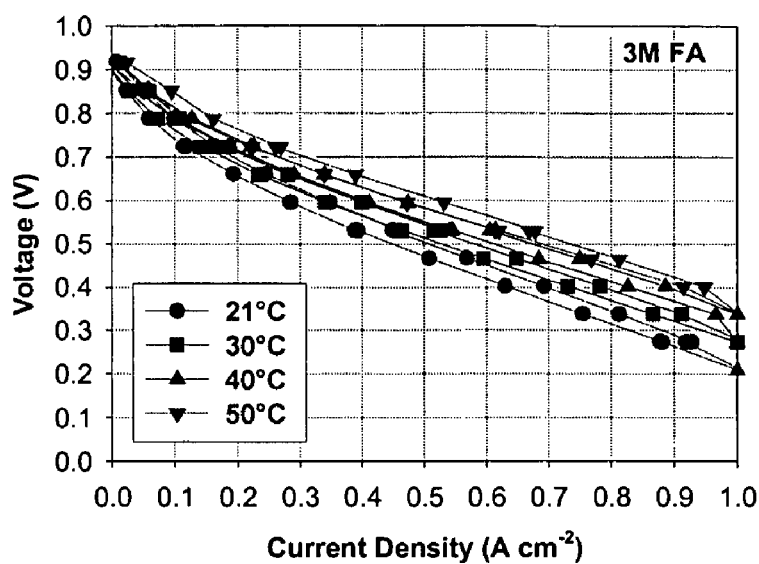

FIG. 3 is a polarization plot of a 3 M formic acid/air fuel cell at 21, 30, 40 and 50° C. The flow rate of liquid fuel to the anode was 1 mL/min. Air was supplied to the cathode at a flow rate of 350 mL/min without back-pressure and/or humidification.

Figure 4:
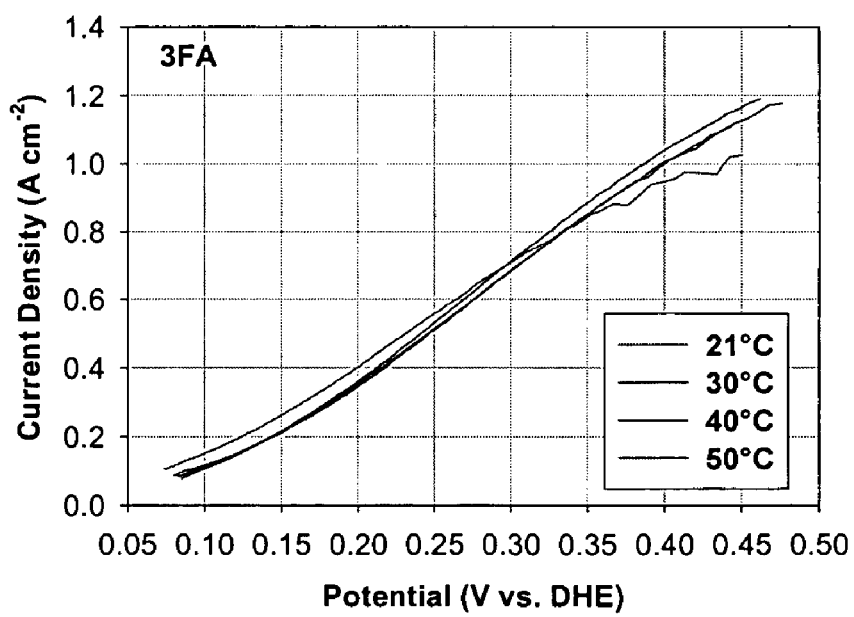

FIG. 4 is an anode polarization plot of 3.0 M formic acid at 21, 30, 40, and 50° C. The flow rate of formic acid to the anode was 1 mL/min. Hydrogen was supplied to the cathode at a flow rate of 100 mL/min.

Figure 5:
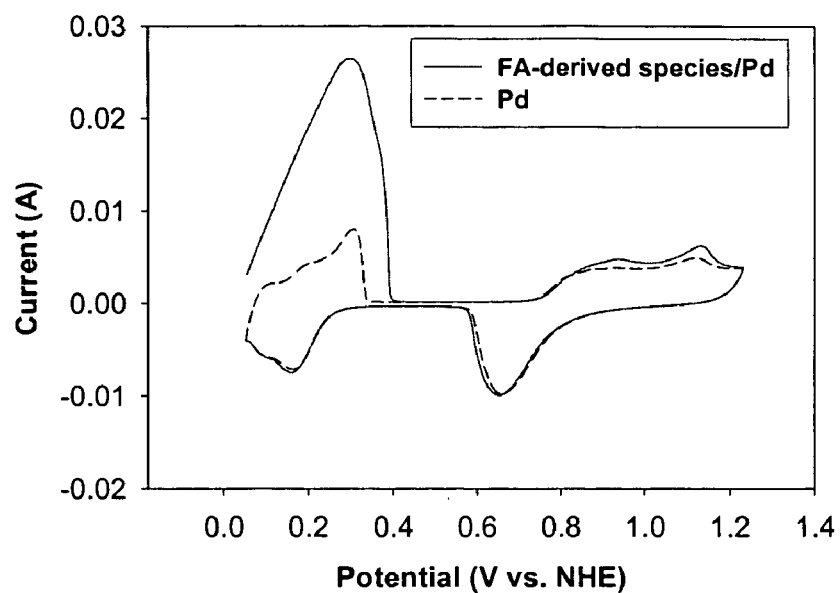

FIG. 5 is a cyclic voltammetry plot of palladium nanoparticles electrode in 0.5 M $H_2SO_4$. The potential scan rate is 20 mV/s. The dashed line represents the clean palladium electrode, and the sold line represents adsorbed species on the palladium electrode, which was derived from formic acid oxidation.

Figure 6:
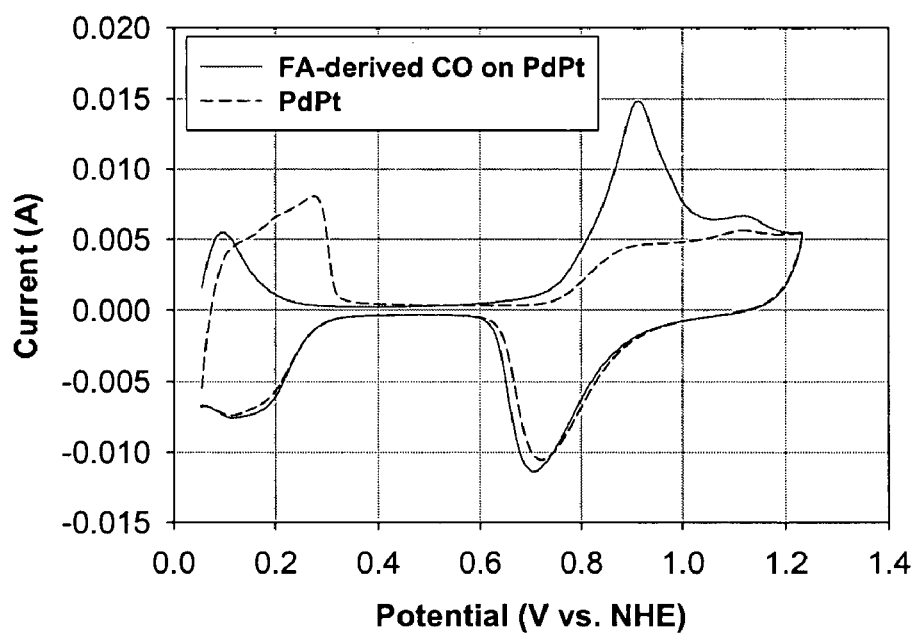

FIG. 6 is a cyclic voltammetry of $Pd_{50}Pt_{50}$ nanoparticles electrode in 0.5 M $H_2SO_4$. The potential scan rate is 20 mV/s. The dashed line represents the clean palladium electrode, and the solid line represents adsorbed species on $Pd_{50}Pt_{50}$ electrode, which was derived from formic acid oxidation.

Figure 7:
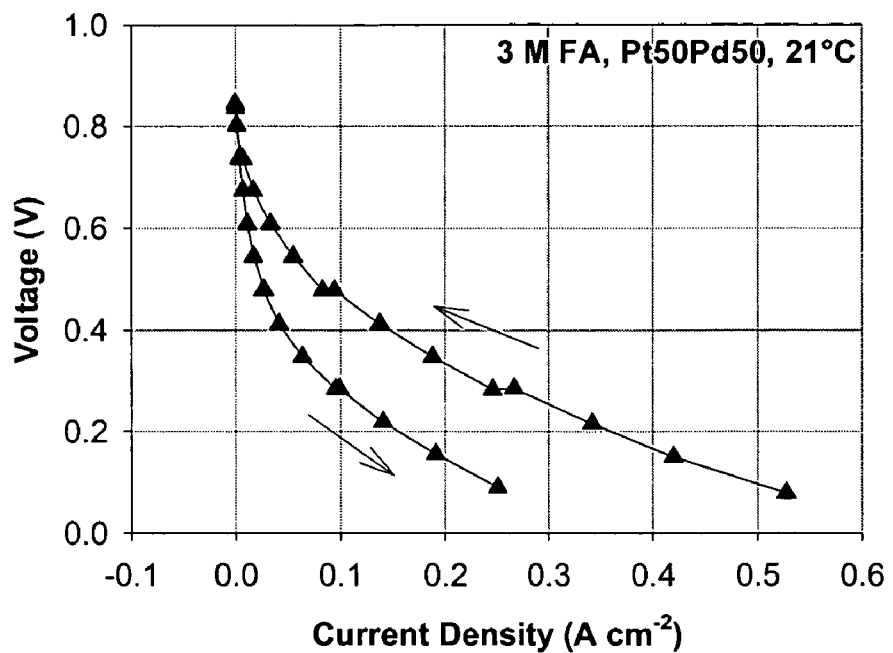

FIG. 7 is a polarization plot of a 3 M formic acid/air fuel cell at 21° C. The flow rate of liquid fuel to the anode was 1 mL/min. Air was supplied to the cathode at a flow rate of 350 mL/min without back-pressure and/or humidification.

Figure 8:
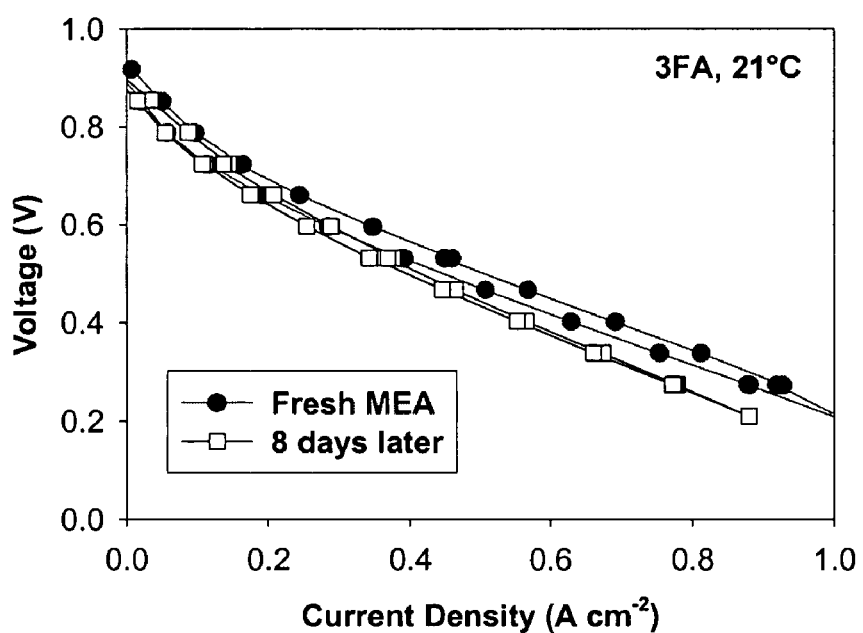

FIG. 8 is a polarization plot of a 3 M formic acid/air fuel cell at 21° C. The flow rate of liquid fuel to the anode was 1 mL/min. Air was supplied to the cathode at a flow rate of 350 mL/min without back-pressure and/or humidification. The solid circle plot was obtained by employing a fresh MEA with Pd anode; the empty square plot was observed by employing the same MEA 8 days later.

DETAILED DESCRIPTION OF PREFERRED EMBODIMENT(S)

The schematic of FIG. 1 shows an exemplary direct organic fuel cell generally at 10. The fuel cell 10 includes an anode 12, a solid polymer electrolyte 14, and a gas diffusion cathode 16. The anode 12 is enclosed in an anode enclosure 18, while the cathode 16 is enclosed in a cathode enclosure 20. When an electrical load (not shown) is connected between the anode 12 and cathode 16 via an electrical linkage 22, electro-oxidation of an organic fuel occurs at the anode 12 and electro-reduction of an oxidant occurs at the cathode 16. Oxidants can include, but are not limited to, air, oxygen, nitrogen dioxide, hydrogen peroxide, and potassium permanganate.

The occurrence of different reactions at the anode 12 and cathode 16 gives rise to a voltage difference between the two electrodes. Electrons generated by electro-oxidation at the anode 12 are conducted through the linkage 22 and are ultimately captured at the cathode 16. Hydrogen ions or protons generated at the anode 12 are transported across the membrane electrolyte 14 to the cathode 16. Thus, a flow of current is sustained by a flow of ions through the cell and electrons through the linkage 22. This current can be exploited to power an electrical device, for instance.

The anode 12, solid polymer electrolyte 14, and cathode 16 are preferably a single multi-layer composite structure commonly referred to as a membrane electrode assembly ("MEA"). Preferably the solid polymer electrolyte 14 is a proton-conducting cation exchange membrane that contains an anionic sulfate, such as the perfluorinated sulfonic acid polymer membrane commercially available under the registered trademark NAFION from DuPont Chemical Co., Delaware. NAFION is a copolymer of tetrafluoroethylene and perfluorovinylether sulfonic acid. Other membrane materials can also be employed, with examples including membranes of modified perfluorinated sulfonic acid polymer, polyhydrocarbon sulfonic acid, membranes containing other acidic ligands and composites of two or more kinds of proton exchange membranes.

Each of the anode 12 and the cathode 16 includes a catalyst layer with an example being fine palladium particles either supported or unsupported. When employing a preferred unitary MEA, the anode 12 and cathode 16 can consist of catalyst layers directly applied to opposite sides of the NAFION membrane. NAFION is available in standard thicknesses that include 0.002 in. and 0.007 in. A unitary MEA can be fabricated by directly applying or painting anode and cathode catalyst inks onto opposing surfaces of the membrane 14. When the catalyst ink dries, solid catalyst particles adhere to the membrane 14 to form the anode 12 and the cathode 16.

If the catalyst is to be supported, a suitable support includes fine carbon particles or high surface area carbon sheeting that makes electrical contact with the particles of the electrocatalyst. By way of particular example, the anode 12 can be formed by mixing electrocatalyst materials such as a metal with a binder such as NAFION, and spread on carbon backing paper. The backing paper can then be attached to a surface of the NAFION membrane 14. The cathode electrocatalyst alloy and the carbon fiber backing may contain TEFLON to provide hydrophobicity to create a three-phase boundary and to achieve efficient removal of water produced by electro-reduction of oxygen. The cathode catalyst backing is attached to the surface of the NAFION electrolyte membrane 14 opposite of the anode 12.

Exemplary fuel cell 10 employs a formic acid solution as the fluid fuel stream, although other organic fuels are contemplated. The formic acid fuel is supplied to the anode enclosure 18, while an oxidant such as air or higher concentrated $O_2$ is supplied to the cathode enclosure 20. At the anode 12 the formic acid fuel is oxidized:

$$HCOOH \rightarrow 2H^+ + CO_2 + 2e^- \quad \text{(Rxn. 1)}.$$

The $CO_2$ product flows out of the chamber via a gas removal port 24.

The $H^+$ product of Rxn. 1 passes through the polymer electrolyte layer 14 to the cathode 16, and the free electron $2e^-$ product flows through the electrical linkage 22 to the cathode 16. At the cathode 16 the reduction reaction occurs:

$$O_2 + 2e^- + 2H^+ \rightarrow 2H_2O \quad \text{(Rxn. 2)}.$$

The $H_2O$ product flows out of the cathode enclosure 20 via a removal port 26. Pumps or other means can be provided to drive the flow of the formic acid fuel and of the air/$O_2$.

It has been discovered that use of a formic acid fuel for oxidation at the anode 12 provides many advantages. Formic acid is a relatively strong electrolyte and thus facilitates good proton transport within the anode enclosure 18. Formic acid has a relatively low vapor pressure, and remains in liquid state at room temperature. Also, the present formic acid/oxygen fuel cells have a high theoretical open circuit potential or emf of about 1.45 V.

In another embodiment, anode catalysts for use with direct organic fuel cells include palladium nanoparticles. In this context, palladium nanoparticles are defined as particles that are more than 90% by weight of palladium, on a transition metal basis. In other words, the weight of inert materials, such as a carbon supporting material, would be ignored. Palladium nanoparticles also have at least one of the following attributes: (a) an average diameter of less than 1000 nm, and/or (b) a surface area greater than 0.1 m²/g. Preferably, the present electro-oxidation catalysts include substantially pure palladium nanoparticles with a surface area of above about 23 m²/g. More preferably, the present electro-oxidation catalysts include substantially pure palladium nanoparticles with a surface area of above about 40 m²/g. Preferably, the palladium nanoparticles have a diameter of less than about 15 nm. More preferably, the palladium nanoparticles have a diameter less than about 10 nm. Most preferably, the palladium nanoparticles have a diameter of about 6 nm.

The present catalysts have been discovered to be particularly advantageous when employed with the present formic acid fuel cells because it is believed the palladium nanoparticle catalyst promotes direct formic acid oxidation and prevents poisoning of the catalyst with carbon monoxide (CO) while providing increased current and voltage efficiency. In the present application, formic acid is defined as including formic acid and its formate derivatives, including, but not limited to, formate salts, formate esters, and other formate compounds.

Formic acid oxidation is believed to occur primarily through two parallel reaction pathways in the presence of a metal catalyst such as palladium or platinum. One is via a dehydration mechanism that forms CO as an intermediate:

$$HCOOH+M \rightarrow M\text{-}CO+H_2O \quad (Rxn.\ 3).$$

$$H_2O+M \rightarrow M\text{-}OH+H^++e^- \quad (Rxn.\ 4).$$

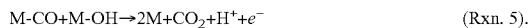

$$M\text{-}CO+M\text{-}OH \rightarrow 2M+CO_2+H^++e^- \quad (Rxn.\ 5).$$

Formic acid adsorbs onto the metal catalyst surface (M), forming an intermediate adsorbed CO species (Rxn. 3). An adsorbed OH group (formed in Rxn. 4) is then required to further oxidize the adsorbed CO intermediate into gaseous $CO_2$ (Rxn. 5).

The second pathway is more direct, and follows a dehydrogenation mechanism:

$$HCOOH+M \rightarrow CO_2+M+2H^++2e^- \quad (Rxn.\ 6).$$

This reaction path forms the product $CO_2$ directly and circumvents the adsorbed CO intermediate poisoning step with the result that substantially no CO intermediate is formed. This direct pathway has the advantage that less of the catalyst is poisoned by CO, so less catalyst is needed in the fuel cell 10 for high current densities to be obtained.

This direct reaction path also enhances the overall reaction rate, especially at lower anode potentials where surface hydroxide groups are not available on the catalyst.

Finally, in addition to poisoning the catalyst, CO formation is generally undesirable due to its poisonous nature. It is believed that the preferred palladium nanoparticle catalyst promotes Rxn. 6 without promoting Rxn. 3. Thus, use of the preferred palladium nanoparticle catalyst overcomes problems from CO formation associated with prior art fuel cells and catalysts.

A further advantage of the present catalysts is that palladium nanoparticle catalysts exhibit higher catalyst activity and higher voltage efficiency, allowing fuel cells to be made that run at a higher voltage with lower cost. In addition, palladium is less expensive than previously employed catalysts such as platinum, platinum-palladium, or platinum-ruthenium.

In order to best illustrate its various aspects, an embodiment of the present fuel cell was operated using varying fuel concentrations. The performance of this exemplary cell and catalyst is discussed below.

Exemplary Fuel Cell 1

The first exemplary fuel cell is generally consistent with the fuel cell 10 shown in FIG. 1. Element numbers from that fuel cell will be used where appropriate for convenience. The anode 12 formulation was a composite containing about 85% by weight palladium anode catalyst and recast NAFION ionomer. An in-house developmental sample of the Pd nanoparticle catalyst, an Alfa-Aesar #00659 Pd nanoparticle catalyst, or an Aldrich #20,583-4 finely comminuted Pd nanoparticle catalyst with a surface area of about 40 m²/g was employed. Where the performance of the new composite material reported here has been compared to that of a commercial PtRu black catalyst, the PtRu black catalyst is obtained from Johnson Matthey, UK. The cathode catalyst employed was an unsupported Pt black catalyst obtained from Johnson Matthey, UK, and is designated Hispec 1000. The exemplary fuel cell's membrane electrode assembly (MEA), including an anode 12, a NAFION electrolyte membrane 14, and a cathode 16 was fabricated using a direct paint technique to apply catalyst layers 12 and 16 to NAFION membrane 14.

A colloid-aided chemical reduction method was employed to make the present exemplary palladium nanoparticle catalyst. The multi-step procedure included (1) forming a silica colloid, (2) adding a reducing agent solution (namely, sodium formate) and a metal precursor solution (namely, palladium nitrate) into the colloid, (3) forming palladium nanoparticles on the nano-scaled silica surface, and (4) etching the silica surface to collect the catalyst particles.

The anode and cathode catalyst inks were prepared by mixing appropriate amounts of catalyst powders with 5% recast NAFION solution (1100OEW, Solution Technology, Inc., USA). Both the anode and cathode inks were applied onto either side of a NAFION 115 membrane, which was fixed on a vacuum table. Ink application was typically performed at 60° C., after which the membrane was thermally cured at 80° C. for 15 minutes. The resulting multi-layer MEA forms the anode 12, the electrolyte membrane 14, and the cathode 16.

The effective composition of unsupported anode catalyst was 85% by weight of Pd nanoparticles and 15% by weight of recast NAFION. When the present electro-oxidation catalyst is compared to a PtRu anode catalyst, the effective composition is 85% by weight PtRu and 15% by weight recast NAFION. The anode catalysts employed had a loading of about 10 mg/cm². The geometric surface area of the MEAs employed in this work was 5 cm². The optimized cathode ink formulation was approximately 90% by weight Pt black and 10% by weight NAFION. The cathode catalyst employed had a standard loading of about 8 mg/cm².

The anode of the MEAs was cleaned by cycling potential between 0.1 and 1.2 V. The MEAs were conditioned in a fuel cell. Once no further change in cell performance and resistance was observed with time, the conditioning was ended.

FIG. 2 illustrates cell polarization curves for the exemplary 3 M formic acid/air fuel cell employing a palladium nanoparticle anode catalyst as compared with 3 M formic acid/air and 1 M methanol/air fuel cells employing platinum-ruthenium catalysts. Cell polarization curves measure the overall cell activity at the various anode fuel feel concentrations.

As illustrated by FIG. 2, the open circuit voltage for the exemplary formic acid/air fuel cell was at least 0.8 V, nominally about 0.9 V. At 0.1 A/cm$^2$, the cell voltage was above 0.75 V, which corresponds to a significantly high voltage efficiency of 54%. A maximum power density of about 270 mW/cm$^2$ was observed at 0.4 V. Compared with the performance of fuel cells employing well-accepted Pt—Ru anode catalysts, a palladium nanoparticle catalyst provides much better performance of fuel cells over the entire range of current densities. Direct formic acid fuel cells (DFAFC) with a palladium nanoparticle catalyst outperformed the one with a PtRu anode catalyst by more than 237% (or 3.4 times) in the maximum power density, and outperformed the direct methanol fuel cell (DMFC) with a PtRu anode catalyst by more than 440% (or 5.4 times). Palladium, however, is not a good anode catalyst for methanol oxidation. Table 1 compares the maximum power densities for the polarization curves in FIG. 2.

TABLE 1

| Fuel Cells, 1° C. with dry air | Maximum Power Density mW/cm$^2$ |
|---|---|
| 3 M formic acid/air (Aldrich #20,583-4 Pd catalyst; 40 m$^2$/g, 6 nm average particle diameter) | 270 |
| 3 M formic acid/air (laboratory-prepared Pd catalyst; 23 m$^2$/g, 10 nm average particle diameter) | 61 |
| 3 M formic acid/air (Pt—Ru catalyst) | 80 |
| 1 M methanol/air (Pt—Ru catalyst) | 50 |

Persons skilled in the technology involved here will recognize that particles with a surface area of 5-10 m$^2$/g would show analogous effects, though perhaps not as pronounced as in the examples set forth in Table 1 above. Persons skilled in the technology involved here will also recognize that particles with a diameter up to 15 nm radius 7.5 nm.

FIG. 3 illustrates cell polarization curves for the exemplary fuel cell employing a palladium nanoparticle anode catalyst at a range of temperatures. At 50° C., current densities of 0.1, 0.5, and 0.9 A/cm$^2$ are achieved at 0.82, 0.61, and 0.41 V, respectively. Above a current density of 1.0 A/cm$^2$, the current density is beyond the safety limitation of the fuel cell test station, which is designed for small devices. Thus, the current density drop around 1.0 A/cm$^2$ is not due to the mass transport of formic acid but programming safety protection.

FIG. 3 demonstrates that direct formic acid fuel cells can be well-operated at different cell temperatures from 21-50° C. Above 50° C., there is no significant further performance benefit because of effects of partial pressure of oxygen, formic acid crossover, and temperature dependent kinetics. The maximum power densities are relatively encouraging at 40 and 50° C.: 350 and 375 mW/cm$^2$, respectively. Even around ambient temperatures, the maximum power densities are 270 and 300 mW/cm$^2$ at 21 and 30° C., respectively. Table 2 compares the maximum power densities for the exemplary fuel cell at different temperatures.

TABLE 2

| Temperature ° C. | Power Density at 0.4 V mW/cm$^2$ |
|---|---|
| 21 | 270 |
| 30 | 300 |
| 40 | 250 |
| 50 | 375 |

FIG. 4 illustrates anode polarization plots of 3 M formic acid at a range of temperatures. The flow rate of formic acid to the anode was 1 mL/min. Hydrogen was supplied to the cathode at a flow rate of 100 mL/min. In FIG. 4, the potential is directly reference against a dynamic hydrogen reference electrode (DHE). This removes the effects of the cathode, thereby facilitating the quantitative interpretation of the catalyst/fuel performance results. FIG. 4 demonstrates that the oxidation of 3 M formic acid at a palladium nanoparticle electrode is almost independent of the cell temperature employed. Therefore, FIG. 4 shows that the rate constant for formic acid oxidation is approximately temperature independent. At a low potential (e.g., 0.2 V), the anode polarization current density is a high as about 0.4 A/cm$^2$. The onset potential for formic acid is lower than 0.07 V, the starting point.

The results in FIG. 4 also imply that the formic acid oxidation at a palladium nanoparticle anode may have a very low activation energy. This low activation energy for oxidation of formic acid is evidence that formic acid oxidation at a palladium nanoparticle anode occurs via a direct mechanism that does not include formation of CO as an intermediate. The reaction rate constant for the mechanism including the CO intermediate (Rxns. 3, 4, and 5) is clearly temperature dependent as the sluggish CO oxidation has a high activation energy. Palladium nanoparticles facilitate the decomposition of formic acid with a low activation energy. Therefore, increasing the temperature does not further favor its decomposition. It is reasonable to assume that the fuel cell polarization benefit (in FIG. 3) with increasing temperature may come from the cathode side, that is, temperature dependent oxygen reduction.

FIG. 5, a cyclic voltammogram (CV) of palladium nanoparticles in 0.5 M $H_2SO_4$, demonstrates that formic acid oxidation occurs via the direct decomposition route. The potential scan rate was 20 mV/s, and a conventional three-electrode electrochemical cell was employed, with a palladium nanoparticle working electrode, a platinum wire acting as a counter electrode, and a silver/silver chloride reference electrode. The final potential is referred to a normal hydrogen electrode (NHE). The palladium working electrode potential was then cyclically swept from 0.6 to 0.1 V in 3.0 M formic acid solution at a low scan rate of 2 mV/s. After the potential sweep, the palladium electrode was rinsed with $N_2$ purged Milli-Q water to remove unreacted formic acid, and then transferred to another electrochemical cell with 0.5 M $H_2SO_4$, followed by the removal of chemisorbed species from the catalyst surface in a single voltammetric scan between 0.05 and 1.2 V at a scan rate of 20 mV/s.

As demonstrated by the solid line in FIG. 5, a catalytic oxidation peak was observed with the peak potential at 0.3 V. There was no CO oxidation peak at potentials around 0.6 to 1.0 V, which is the potential range for CO oxidation at various metal electrodes, such as Pt, Au, Pd, Ag, and PtRu. The peak around 0.3 V definitely results from the adsorbed species on the Pd electrode because the Pd electrode surface was completely cleaned up at the potential beyond 0.4 V, which can be confirmed by comparing the cyclic voltammogram with the one of the clean Pd nanoparticle electrode (the dashed line in FIG. 5). The peak around 0.3 V may be a result of the formate anion, since it can be oxidized at a low potential like 0.3 V. At least, the CO intermediate can be excluded. The experimental results set forth in FIG. 5 represent even stronger evidence of the diminution of CO formation than in the results discussed earlier with respect to FIG. 4.

FIG. 6, a cyclic voltammogram (CV) of $Pd_{50}Pt_{50}$ nanoparticles in 0.5 M $H_2SO_4$, demonstrates that formic acid oxidation employing the $Pd_{50}Pt_{50}$ catalyst occurs, at least in part, via the indirect route with the CO intermediate. The experiments were carried out in a way identical to FIG. 5. A clear CO oxidation peak can be observed around 0.9 V (the solid line in FIG. 6). There was no catalytic oxidation peak around 0.3 V. The small peak at 0.1 V is a typical oxidation peak of adsorbed hydrogen atoms at the electrode surface.

Since a CO intermediate species was formed during formic acid oxidation at $Pd_{50}Pt_{50}$, a bi-functional mechanism can be applied in this case, which is the typical mechanism for formic acid oxidation or methanol oxidation at the prior art catalysts. Therefore, the fuel cell performance with a $Pd_{50}Pt_{50}$ anode catalyst is comparable with the well-accepted PtRu catalyst, based on the same mechanism.

FIG. 6 illustrates a polarization plot of 3 M formic acid/air fuel cell employing a $Pt_{50}Pd_{50}$ anode catalyst. The flow rate of liquid fuel to the anode was 1 mL/min. Air was supplied to the cathode at a flow rate of 350 mL/min without back-pressure and/or humidification. Starting at a cell voltage of 0.1 V and rising to a cell voltage of 0.85 V, the cell generated a maximum power density of 70 mW/cm$^2$. However, the CO species was accumulated during this period and poisoned the catalyst, as well as ultimately leading to a significant performance drop during the backward voltage change from 0.85 to 0.1 V. This is a typical example of the effect of CO poisoning on cell performance. The present palladium nanoparticle catalysts are able to generate very high power output in part because the quantity of CO poisoning intermediates, formed during formic acid oxidation at the palladium anode, is diminished or avoided altogether.

Table 3 compares the power density of direct formic acid fuel cells as the concentration of formic acid in the fuel cell changes. In general, low concentrations of formic acid cannot sustain fuel cell operation at higher current densities because of mass transport limitations. A use of high concentration of formic acid is helpful to overcome mass transport limitation. 3.0 M formic acid generates the largest maximum power densities. The maximum power density decreases as concentration increases to 10.0 M and 15.0 M. However, a maximum power density of 150 mW/cm$^2$ can be achieved at 0.4 V with 15.0 M formic acid, which is still a relatively high power density under the experimental conditions. The concentration-dependent crossover of formic acid may be one of crucial factors that affects the output of fuel cells. Another reason may be that formic acid exists in other forms under highly concentrated conditions, such as dimers.

TABLE 3

| [Formic Acid] M | Power Density @ 0.4 V mW/cm$^2$ |
| --- | --- |
| 3 | 270 |
| 10 | 200 |
| 15 | 150 |

In FIG. 7, polarization plots of an exemplary formic acid/air fuel cell and the same fuel cell eight days later illustrate that a fuel cell with a palladium nanoparticle electrode is stable over time. For example, a newly prepared MEA with Pd anode generated good performance. Then the MEA was employed for evaluation of temperature-dependence and concentration-dependence of the fuel cell performance. Eight days later, the MEA was tested again under the identical conditions. The result was represented by the empty square plot in FIG. 7. There is no difference in the kinetic region of the cell polarization, below 0.2 A/cm$^2$, which is an indication of catalyst activity. A slight difference can be observed in the ohmic and mass transport polarization regions, which are affected by changes in the polymer electrolyte membrane and recast polymer binder in the catalyst layers.

The performance results of the exemplary fuel cell shows that the present formic acid fuel cells and catalysts show favorable suitability for use in power applications. The advantages offered over prior art fuel cells can be of particular utility in mini- or microelectronic device applications. The open cell voltage of a formic acid fuel cell is higher than that of the prior art fuel cells, so power management is easier. The voltage efficiency of the present formic acid fuel cell is also higher than that of prior art fuel cells. The higher open cell voltage and voltage efficiency mean that the present formic acid fuel cells can be employed to power a wider range of devices than the existing organic fuel cells.

The higher open cell voltage and voltage efficiency are possible in part because palladium nanoparticle catalysts selectively employ the direct method of converting formic acid to water, carbon dioxide, and electricity without the production of CO intermediate. This selection of the direct mechanism means less poisoning of the catalyst by CO, and therefore better catalyst performance.

In addition, achieving a higher open cell voltage and voltage efficiency is more cost effective in the present formic acid fuel cell because palladium catalysts are generally less expensive than platinum-containing catalysts.

It will be appreciated that because of the relatively low potential of a single formic acid fuel cell, these and other applications can include a plurality of fuel cells such as the fuel cell 10 in series.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A direct organic fuel cell comprising:
   a fluid fuel comprising formic acid;
   an anode to which said fluid fuel is directed, said anode having an electrocatalyst associated therewith, said electrocatalyst comprising palladium nanoparticles;
   a fluid oxidant;
   a cathode to which said fluid oxidant is directed, said cathode electrically connected to said anode; and
   an electrolyte interposed between said anode and said cathode.

2. The direct organic fuel cell of claim 1, wherein said fluid fuel comprises at least 3 M formic acid.

3. The direct organic fuel cell of claim 1, wherein said anode is disposed within an anode enclosure, said fluid fuel flowable within said anode enclosure.

4. The direct organic fuel cell of claim 1, wherein the cathode is disposed within a cathode enclosure, said fluid oxidant flowable within said cathode enclosure.

5. The direct organic fuel cell of claim 1, wherein the electrolyte is an ion exchange membrane.

6. The direct organic fuel cell of claim 5, wherein said electrolyte is a proton exchange membrane.

7. The direct organic fuel cell of claim 6, wherein said proton exchange membrane comprises a perfluorosulfonic acid ionomer.

8. The direct organic fuel cell of claim 5, wherein said ion exchange membrane is substantially impermeable to said fuel.

9. The direct organic fuel cell of claim 1, wherein the electrolyte is selected from the group comprising porous silicon, ruthenium oxide, and acid electrolytes.

10. The direct organic fuel cell of claim 1, wherein said anode catalyst comprises palladium nanoparticles, said nanoparticles having at least one of a diameter of less than about 15 nm and a radius of curvature less than about 7.5 nm.

11. The direct organic fuel cell of claim 1, wherein said anode catalyst comprises palladium nanoparticles, said nanoparticles having at least one of: a diameter of less than about 10 nm and a radius of curvature less than about 5 nm.

12. The direct organic fuel cell of claim 1, wherein said anode catalyst comprises palladium nanoparticles, said nanoparticles having at least one of: a diameter of less than about 6 nm and a radius of curvature less than about 3 nm.

13. The direct organic fuel cell of claim 1, wherein said anode catalyst comprises palladium nanoparticles with a surface area of at least about 5 $m^2/g$.

14. The direct organic fuel cell of claim 1, wherein said anode catalyst comprises palladium nanoparticles with a surface area of at least about 23 $m^2/g$.

15. The direct organic fuel cell of claim 1, wherein said anode catalyst comprises palladium nanoparticles with a surface area of at least about 40 $m^2/g$.

16. The direct organic fuel cell of claim 1, wherein said fuel comprises between about 21% and about 100% by weight of formic acid.

17. The direct organic fuel cell of claim 1, wherein said fuel comprises between about 25% and about 65% by weight of formic acid.

18. The direct organic fuel cell of claim 1 wherein said fuel comprises at least about 30% by weight of water.

19. The direct organic fuel cell of claim 1 wherein said oxidant comprises air and said formic acid has a concentration between about 50% and about 70% by weight.

20. The direct organic fuel cell of claim 1 wherein said oxidant comprises air and wherein said formic acid has a concentration between about 20% and about 40% by weight.

21. The direct organic fuel cell of claim 1, wherein the cell is capable of generating a power density of at least about 150 $mW/cm^2$ when operating at about 21° C.

22. The direct organic fuel cell of claim 1 wherein the cell is capable of generating a power density of at least about 270 $mW/cm^2$ when operating at about 21° C.

23. The direct organic fuel cell of claim 1 wherein the cell is capable of generating an open circuit voltage of at least about 0.8 V.

24. The direct organic fuel cell of claim 1, wherein said anode catalyst is configured to promote reaction of said formic acid via a direct path that diminishes formation of a CO intermediate.

25. The direct organic fuel cell of claim 1, wherein said electrocatalyst consists essentially of palladium nanoparticles.

26. The direct organic fuel cell of claim 1, wherein said anode catalyst comprises palladium nanoparticles, said nanoparticles having a radius of curvature less than about 7.5 nm.

27. The direct organic fuel cell of claim 1, wherein said anode catalyst comprises palladium nanoparticles, said nanoparticles having a radius of curvature less than about 5 nm.

28. The direct organic fuel cell of claim 1, wherein said anode catalyst comprises palladium nanoparticles, said nanoparticles having a radius of curvature less than about 3 nm.

* * * * *